(12) United States Patent
Shimizu et al.

(10) Patent No.: US 9,721,208 B2
(45) Date of Patent: Aug. 1, 2017

(54) LIVING ACTIVITY INFERENCE DEVICE, PROGRAM, AND COMPUTER-READABLE RECORDING MEDIUM

(71) Applicant: Panasonic Corporation, Osaka (JP)

(72) Inventors: Noriyoshi Shimizu, Osaka (JP); Takashi Nishiyama, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 396 days.

(21) Appl. No.: 14/388,864

(22) PCT Filed: Feb. 1, 2013

(86) PCT No.: PCT/JP2013/000548
§ 371 (c)(1),
(2) Date: Sep. 29, 2014

(87) PCT Pub. No.: WO2013/157175
PCT Pub. Date: Oct. 24, 2013

(65) Prior Publication Data
US 2015/0058275 A1 Feb. 26, 2015

(30) Foreign Application Priority Data
Apr. 19, 2012 (JP) .................................. 2012-095949

(51) Int. Cl.
G06F 9/44 (2006.01)
G06N 7/02 (2006.01)
(Continued)

(52) U.S. Cl.
CPC .............. G06N 5/048 (2013.01); G05F 1/66 (2013.01); G06Q 50/06 (2013.01);
(Continued)

(58) Field of Classification Search
CPC combination set(s) only.
See application file for complete search history.

(56) References Cited

U.S. PATENT DOCUMENTS 7,917,580 B2 * 3/2011 Sim ..................... G06F 21/316
348/143
8,724,978 B2 * 5/2014 Furumura ................. F22B 1/28
392/484
(Continued)

FOREIGN PATENT DOCUMENTS

JP 2002-304681 A 10/2002
JP 2008-310729 A 12/2008
(Continued)

OTHER PUBLICATIONS

Distribution system operation enhancement through household consumption coordination in a dynamic pricing environment Nikolaos G. Paterakis; Miguel F. Medeiros; João P. S. Catalão; Ozan Erdinc 2015 IEEE Eindhoven PowerTech Year: 2015 pp. 1-6, DOI: 10.1109/PTC.2015.7232424 IEEE Conference Publications.*
(Continued)

*Primary Examiner* — Michael B Holmes
(74) *Attorney, Agent, or Firm* — Renner, Otto, Boiselle & Sklar, LLP

(57) ABSTRACT

The living activity inference device according to the present invention includes: an obtainer configured to obtain an energy consumption of an electric appliance; an appliance operation detector configured to identify an operational state of the electric appliance based on the energy consumption obtained by the obtainer; and an activity inferrer configured to perform an inference process of determining which one of a plurality of living activities predetermined a current living activity corresponds to, based on existing information including the operational state of the electric appliance
(Continued)

identified by the appliance operation detector and a past living activity.

13 Claims, 4 Drawing Sheets

(51) Int. Cl.
- G06N 7/06 (2006.01)
- G06N 5/04 (2006.01)
- G05F 1/66 (2006.01)
- G06Q 50/06 (2012.01)
- G08B 21/04 (2006.01)
- G08B 21/18 (2006.01)

(52) U.S. Cl.
  CPC ..... *G08B 21/0423* (2013.01); *G08B 21/0484* (2013.01); *G08B 21/182* (2013.01); *G05B 2219/2642* (2013.01)

(56) References Cited

U.S. PATENT DOCUMENTS

| | | | |
|---|---|---|---|
| 2010/0312876 A1* | 12/2010 | Sim | G06F 21/316 709/224 |
| 2012/0226572 A1* | 9/2012 | Park | H02J 3/14 705/26.1 |
| 2013/0071804 A1* | 3/2013 | Namura | A61C 7/00 433/24 |
| 2013/0302021 A1* | 11/2013 | Furumura | F22B 1/28 392/491 |
| 2015/0058275 A1* | 2/2015 | Shimizu | G08B 21/182 706/52 |
| 2015/0136370 A1* | 5/2015 | Furumura | F28F 3/12 165/165 |
| 2016/0366496 A1* | 12/2016 | Nishiyama | G06Q 10/00 |
| 2016/0371593 A1* | 12/2016 | Nishiyama | G08B 21/0423 |
| 2017/0011304 A1* | 1/2017 | Shimizu | H02J 13/00 |
| 2017/0108351 A1* | 4/2017 | Shimizu | G01D 4/002 |
| 2017/0109467 A1* | 4/2017 | Shimizu | G06F 17/5045 |

FOREIGN PATENT DOCUMENTS

| | | |
|---|---|---|
| JP | 2009-043141 A | 2/2009 |
| JP | 2009-109242 A | 5/2009 |
| JP | 2009-300367 A | 12/2009 |
| JP | 2010-050664 A | 3/2010 |
| JP | 2010-182072 A | 8/2010 |
| JP | 2011-248923 A | 12/2011 |

OTHER PUBLICATIONS

Applying power meters for appliance recognition on the electric panel Gu-yuan Lin; Shih-chiang Lee; Jane Yung-jen Hsu; Wan-rong Jih 2010 5th IEEE Conference on Industrial Electronics and Applications Year: 2010 pp. 2254-2259, DOI: 10.1109/ICIEA.2010.5515385 IEEE Conference Publications.*

A magnetic field-based appliance metering system Niraniini Rajagopal; Suman Giri; Mario Berges; Anthony Rowe 2013 ACM/IEEE International Conference on Cyber-Physical Systems (ICCPS) Year: 2013 pp. 229-238, DOI: 10.1145/2502524.2502555 IEEE Conference Publications.*

Design of information interactive scheme for household appliances of residents Lingji Kong; Bin Li; Bing Qi; Wei He; Junjie Xiong 2015 4th International Conference on Computer Science and Network Technology (ICCSNT) Year: 2015, vol. 01 pp. 1209-1213, DOI: 10.1109/ICCSNT.2015.7490950 IEEE Conference Publications.*

International Search Report for corresponding International Application No. PCT/JP2013/000548 mailed Feb. 26, 2013.

Form PCT/ISA/237 for corresponding International Application No. PCT/JP2013/000548 dated Feb. 26, 2013.

Extended European Search Report for corresponding European Application No. 13778680.2 dated May 7, 2015.

Hyun et al., "AERO: extraction of user's activities from electric power consumption data", IEEE Transaction on Consumer Electronics, IEEE Service Center, New York, NY, US, vol. 56, No. 3, Aug. 1, 2010, pp. 2011-2018, XP011320130, ISSN: 0098-3063.

* cited by examiner

FIG. 6

| Condition | Conclusion |
|---|---|
| (After reset)<br>∧ (G1 : L1 : 0) ∧ (G1 : L2 : 0) ∧ (G2 : L1 : 0)<br>∧ (G2 : L2 : 0) ∧ (G2 : L3 : 0) ∧ (G2 : L4 : 0)<br>∧ (Lapse of confirmation period) | Sleep |
| (After sleep)<br>∧ { (G1 : L1 : 1) ∨ (G1 : L2 : 1) ∨ (G2 : L1 : 1)<br>∨ (G2 : L2 : 1) ∨ (G2 : L3 : 1) ∨ (G2 : L4 : 1) } | Wake-up |
| (After wake-up)<br>∧ (G1 : L1 : 0) ∧ (G1 : L2 : 0) ∧ (G2 : L1 : 0)<br>∧ (G2 : L2 : 0) ∧ (G2 : L3 : 0) ∧ (G2 : L4 : 0)<br>∧ (G3 : L1 : 0) ∧ (G3 : L2 : 0) ∧ (G3 : L3 : 0)<br>∧ (Lapse of confirmation period) | Going out |
| (After going out)<br>∧ { (G1 : L1 : 1) ∨ (G1 : L2 : 1) ∨ (G2 : L1 : 1)<br>∨ (G2 : L2 : 1) ∨ (G2 : L3 : 1) ∨ (G2 : L4 : 1)<br>∨ (G3 : L1 : 1) ∨ (G3 : L2 : 1) ∨ (G3 : L3 : 1) } | Homecoming |
| { (After reset) ∨ (After going out) }<br>∧ (Latest activity time of "homecoming is past") | Sleepover |

…

LIVING ACTIVITY INFERENCE DEVICE, PROGRAM, AND COMPUTER-READABLE RECORDING MEDIUM

TECHNICAL FIELD

The present invention relates to a living activity inference device for inference of a living activity based on an operational state of an electric appliance, a program for realizing the living activity inference device, and a computer-readable recording medium storing the program for realizing the living activity inference device.

BACKGROUND ART

In the past, there has been proposed a technique of inferring a living situation by means of measuring an energy consumption of an electric appliance and determining whether the electric appliance is in operation (e.g., see document 1 [JP 2008-310729 A]).

Further, there has been proposed a technique of inferring a living activity based on a detected operation situation of an electric appliance and a timing of the detected operation situation (e.g., see document 2 [JP 2009-109242 A]).

According to the technique disclosed in document 1, regarding a resident of a residence demanding electricity, an energy consumption of an electric appliance to be purposely operated by a resident is measured in order to identify a living situation of the electric appliance which is, for example, whether a resident is at home, or whether a resident is sleeping or acting. In summary, to improve living safety, the living situation is identified.

Document 2 discloses that information such as appliance types and installation locations of electric appliances is registered, and the appliance types are associated with activity categories. The activity categories include an infrastructure type, an entertainment type, a relaxing type, and a kitchen type. The appliance types are preliminarily associated with the individual activity categories. Document 2 discloses that an activity of a resident is inferred from an operation situation of an electric appliance.

According to documents 1 and 2, living situations of users in residences are inferred from measurement of energy consumptions of electric appliances.

However, the living situation is inferred by use of conditions relating to types, locations, operational states of electric appliances. Hence, there is a problem that an accuracy of a result obtained by inference is not always high.

SUMMARY OF INVENTION

In view of the above insufficiency, an objective of the present invention is to propose a living activity inference device which employs a configuration of inferring a living activity from a monitored operational state of an electric appliance and nevertheless can have an improved inference accuracy, another objective is to propose a program for realizing the living activity inference device, and another objective is to propose a computer-readable recording medium storing the program for realizing the living activity inference device.

The living activity inference device of the first aspect in accordance with the present invention includes: an obtainer configured to obtain an energy consumption of an electric appliance; an appliance operation detector configured to identify an operational state of the electric appliance based on the energy consumption obtained by the obtainer; and an activity inferrer configured to perform an inference process of determining which one of a plurality of living activities predetermined a current living activity corresponds to, based on existing information including the operational state of the electric appliance identified by the appliance operation detector and a past living activity.

In the living activity inference device of the second aspect in accordance with the present invention in combination with the first aspect, the activity inferrer is configured to store a plurality of rules individually corresponding to the plurality of living activities. The inference process includes a selection process and a determination process. The activity inferrer is configured to, in the selection process, select from the plurality of rules a rule to be used in the determination process, depending on the past living activity. The activity inferrer is configured to, in the determination process, determine which one of the plurality of living activities the current living activity corresponds to, based on the rule selected through the selection process and the existing information.

In the living activity inference device of the third aspect in accordance with the present invention in combination with the second aspect, the activity inferrer is configured to store an occurrence order indicative of an order of occurrence of the plurality of living activities. The activity inferrer is configured to, in the selection process, select the rule corresponding to a living activity next to the past living activity in the occurrence order, as the rule to be used in the determination process.

In the living activity inference device of the fourth aspect in accordance with the present invention in combination with the second to third aspect, each rule defines a condition regarding the operational state of the electric appliance associated with the living activity corresponding to the rule.

In the living activity inference device of the fifth aspect in accordance with the present invention in combination with any one of the second to fourth aspects, the operational state includes a start of working indicating that the electric appliance has changed from a resting state to a working state, and an end of working indicating that the electric appliance has changed from the working state to the resting state.

In the living activity inference device of the sixth aspect in accordance with the present invention in combination with the fifth aspect, the appliance operation detector is configured to determine that the operational state is the start of working when the energy consumption obtained by the obtainer exceeds a predetermined threshold. The appliance operation detector is configured to determine that the operational state is the end of working when the energy consumption obtained by the obtainer is equal to or less than the predetermined threshold.

In the living activity inference device of the seventh aspect in accordance with the present invention in combination with any one of the second to sixth aspects, the obtainer is connected to a power sensor for measuring an amount of energy transferred through an energy supply line for supplying energy to the electric appliance, and is configured to obtain the amount of energy measured by the power sensor as the energy consumption of the electric appliance.

In the living activity inference device of the eighth aspect in accordance with the present invention in combination with any one of the second to seventh aspects, the existing information includes at least one of: an intended purpose of a location associated with the electric appliance; information that the energy consumption obtained from the power sensor corresponding to the energy supply line which is not normally connected to the electric appliance exceeds a predetermined threshold; and current time.

In the living activity inference device of the ninth aspect in accordance with the present invention in combination with any one of the second to eighth aspects, at least one of the plurality of rules is a logical disjunction rule. The logical disjunction rule is a rule which determines that the current living activity is a living activity corresponding to the logical disjunction rule when any one of a plurality of conditions regarding the existing information is fulfilled. The activity inferrer is configured to allocate priorities to the plurality of conditions individually. The activity inferrer is configured to determine whether the existing information fulfills one selected from the plurality of conditions in order of the priorities from highest to lowest.

In the living activity inference device of the tenth aspect in accordance with the present invention in combination with the ninth aspect, the activity inferrer is configured to adjust the priorities of the plurality of conditions such that a condition regarding the electric appliance having a greater difference in the energy consumption between the working state and the resting state has a higher priority.

In the living activity inference device of the eleventh aspect in accordance with the present invention in combination with the ninth aspect, the activity inferrer is configured to change the priorities depending on a present season.

In the living activity inference device of the twelfth aspect in accordance with the present invention in combination with any one of the first to eleventh aspects, the existing information includes at least one of: an operational state of a water-use appliance determined based on a water consumption; and an operational state of a gas appliance determined based on a gas consumption.

The program of the thirteenth aspect in accordance with the present invention is a program enabling a computer to function as an obtainer, an appliance operation detector, and an activity inferrer. The obtainer is configured to obtain an energy consumption of an electric appliance. The appliance operation detector is configured to identify an operational state of the electric appliance based on the energy consumption obtained by the obtainer. The activity inferrer is configured to perform an inference process of determining which one of a plurality of living activities predetermined a current living activity corresponds to, based on existing information including the operational state of the electric appliance identified by the appliance operation detector and a past living activity.

The computer-readable recording medium of the fourteenth aspect in accordance with the present invention is a computer-readable recording medium storing a program enabling a computer to function as an obtainer, an appliance operation detector, and an activity inferrer. The obtainer is configured to obtain an energy consumption of an electric appliance. The appliance operation detector is configured to identify an operational state of the electric appliance based on the energy consumption obtained by the obtainer. The activity inferrer is configured to perform an inference process of determining which one of a plurality of living activities predetermined a current living activity corresponds to, based on existing information including the operational state of the electric appliance identified by the appliance operation detector and a past living activity.

BRIEF DESCRIPTION OF THE DRAWINGS

FIG. 6 is a diagram some of a group of rules used in the above living activity inference device.

DESCRIPTION OF EMBODIMENTS

The present embodiment relates to a technique of inferring activities of residents (users) based on operational states of electric appliances used in premises (e.g., a residence). In the following description, the activity of the user is inferred by use of a monitored energy consumed by the electric appliance. Note that, the premises may be buildings for companies, buildings for educational institutes, stations, and facilities.

As described later, in addition to energy consumptions of electric appliances, gas consumptions of gas appliances and water consumptions of water-use appliances (e.g., water taps, toilets, and baths) may be used.

An operational state of an electric appliance is identified by an energy consumption measured by a power sensor for each branch line for supplying energy from a distribution circuit board to a corresponding electric appliance. When a gas appliance is used, an operational state of the gas appliance is identified by use of a gas consumption, and when a water-use appliance is used, an operational state of the water-use appliance is identified by use of a water consumption.

If needed, power sensors may be provided to individual outlets provided to branch lines and an operational state of an electric appliance may be inferred by use of an amount of an energy measured by a power sensor for each outlet.

When an electric appliance has a communication function, an operational state of the electric appliance may be inferred by use of information produced by a sensor provided to the electric appliance.

When an operational state of a gas appliance is used, the operational state may be inferred by use of a flow volume measured by a flow sensor provided to a gas conduit, or information produced by a sensor provided to the gas appliance. When an operational state of a water-use appliance is used, the operational state may be inferred by use of a flow volume measured by a flow sensor provided to a water conduit, or information produced by a sensor provided to the water-use appliance.

Figure 1:
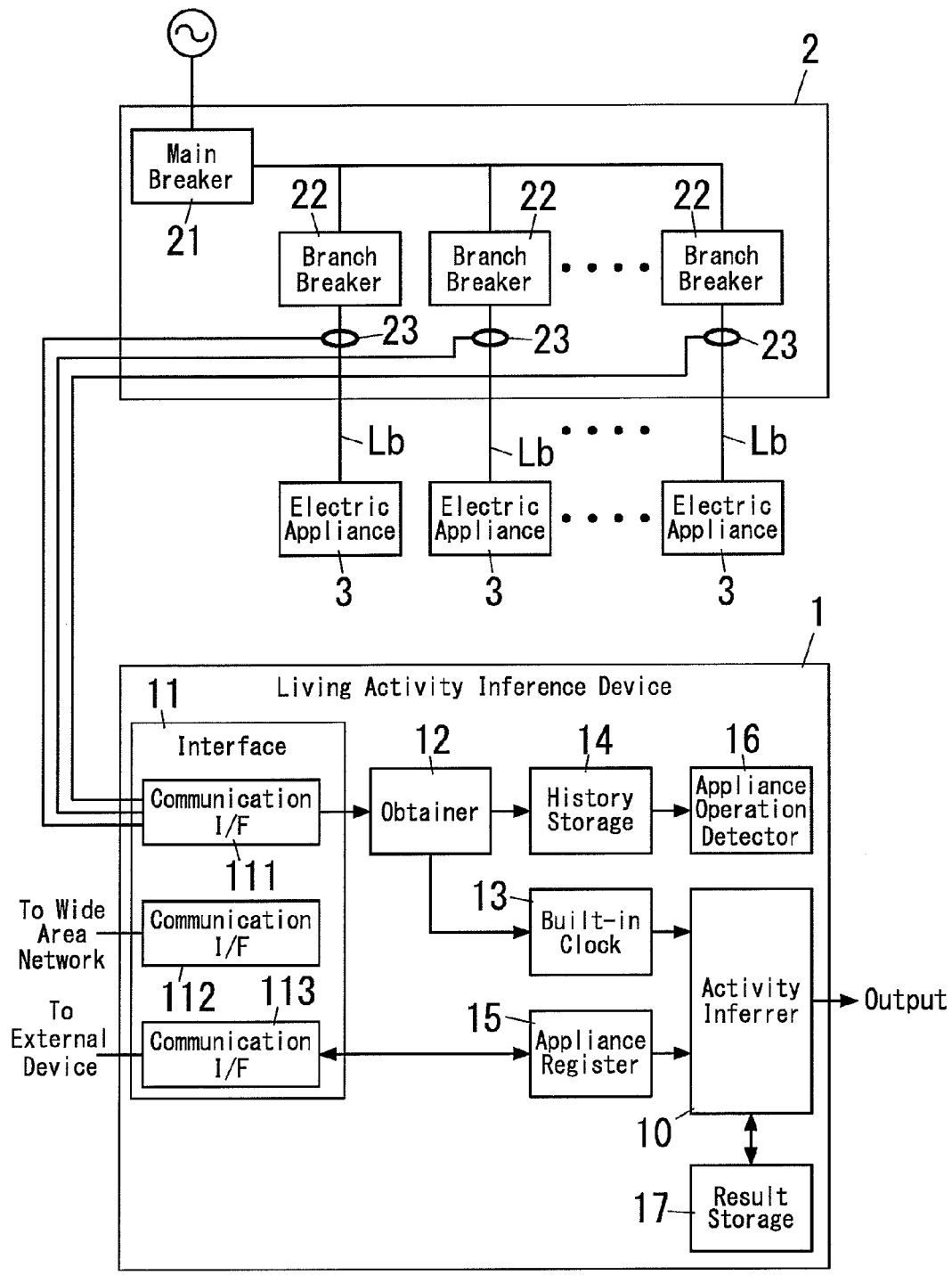
FIG. 1 is a block diagram illustrating a living activity inference device of one embodiment in accordance with the present invention.

As shown in FIG. 1, the living activity inference device 1 of the present embodiment includes an activity inferrer 10, an interface 11, an obtainer 12, a built-in clock 13, a history storage 14, an appliance register 15, an appliance operation detector 16, and a result storage 17. Note that, it is sufficient that the living activity inference device 1 of the present embodiment includes at least the activity inferrer 10, the obtainer 12, and the appliance operation detector 16.

As shown in FIG. 1, a distribution circuit board 2 includes one main breaker 21 and a plurality of branch breakers 22. Each branch breaker 22 is used for supplying energy (electricity) to at least one electric appliance 3 through a branch line Lb. Hereinafter, to simplify explanations, it is assumed that each branch line Lb is connected to one electric appliance 3 and is associated with one of rooms and places in a residence. For example, when the electric appliance 3 with a low capacity (e.g., a lighting fixture) is connected to the branch line Lb, an outlet provided to a room or a place where this lighting fixture is installed is connected to the same branch line Lb as this lighting fixture.

Depending on types of electric appliances 3, some electric appliances 3 are kept connected to the same outlet, and others are connected to the same outlet only when used. Hence, the branch line Lb connected to such an outlet is treated as being equivalent to the branch line connected to the electric appliance 3 to be used.

For example, in many cases, the electric appliance 3 such as a refrigerator, a microwave oven, a washing machine, a video and audio device (e.g., a television receiver, a video recorder, and a stereo amplifier), an information communication device (a telephone, a facsimile, a computer), and a lighting device is kept connected to the same outlet. In contrast the electric appliance 3 such as a rice cooker, a water boiler, a toaster, an iron, a hair dryer, an electric blanket, an electric "kotatsu" is connected to the same outlet only when it is used.

For example, the electric appliance 3 which is connected to the branch line Lb one by one may include an air conditioner, an IH stove, a heat pump water heater, and a floor heating appliance. Another example of the electric appliance 3 may be the electric appliance 3 which is connected to a different outlet depending on the time, such as a vacuum cleaner. However, to simplify the explanation, the present embodiment does not refer to this type of electric appliance 3.

As shown in FIG. 1, a plurality of power sensors 23 are provided on load sides of the branch breakers 22 in order to individually measure amounts of energy sent through the branch lines Lb. Each power sensor 23 detects a current flowing through a corresponding branch line Lb and a voltage between lines of the corresponding branch line Lb. For example, the power sensor 23 employs a current transformer to detect a current.

An output signal from the power sensor 23 is inputted to the living activity inference device 1. The living activity inference device 1 includes a main hardware component constituted by a device which operates according to a program like a microcomputer, and equipped with a memory and an interface. For example, the living activity inference device 1 can be realized by executing, by a dedicated computer or another device such as general purpose computer, a tablet terminal, and a smartphone, a program for implementing functions described later.

As shown in FIG. 1, the living activity inference device 1 includes the interface 11. The interface 11 includes a communication interface (hereinafter referred to as "communication I/F") 111 to obtain the output signal from the power sensor 23. In addition to the communication I/F 111 to obtain the output signal of the power sensor 23, the interface 11 includes a communication interface (hereinafter referred to as "communication I/F") 112 allowing connection to a wide area network such as the Internet, and a communication interface (hereinafter referred to as "communication I/F") 113 allowing communication with external devices such as a personal computers.

The output signal of the power sensor 23 is inputted to the obtainer 12 through the communication interface 111. The obtainer 12 calculates an amount of energy per measurement time (e.g., one second and one minute). In short, the obtainer 12 is configured to obtain an energy consumption of the electric appliance 3. In the present embodiment, the obtainer 12 is connected to the power sensor 23 which measures an amount of energy at the branch line (energy supply line) Lb for supplying energy to the electric appliance 3. The obtainer 12 is configured to obtain the amount of energy measured by the power sensor 23 as the energy consumption of the electric appliance 3.

The power sensor 23 detects a current flowing through the branch line Lb and a voltage between the lines of the branch line Lb. A product of the detected current and the detected voltage is treated as an instantaneous electric power and a product of the instantaneous electric power and the measurement time is treated as an amount of energy per measurement time. Alternatively, electric power for divided time obtained by equally dividing the measurement time may be obtained, and an average of the electric power for divided time over the measurement time may be used as the instantaneous electric power. Alternatively, an amount of energy per divided time may be obtained, and an integral of the amount of energy per divided time over the measurement time may be treated as an amount of energy per measurement time. By use of the average of electric power for divided time or the integral of the amount of energy per divided time, a variation of the amount of energy caused by noises can be canceled. Further, noises can be removed by eliminating high frequency components from the current and the voltage which are measured by the power sensor 23.

The living activity inference device 1 includes the built-in clock (real-time clock) 13 configured to indicate current date and time, and the history storage 14 configured to record the amount of energy for each branch line Lb calculated by the obtainer 12 (i.e., the energy consumption for each electric appliance 3) in association with a time stamp corresponding to the current date and time indicated by the built-in clock 13.

In other words, the history storage 14 stores time series data of the amount of energy for each branch line Lb. A storage capacity of the history storage 14 is selected such that the history storage 14 can store the time series data of the amount of energy for at least one day, and is preferably selected such that the history storage 14 can store the time series data of the amount of energy for one or more years.

The living activity inference device 1 includes the appliance register 15 configured to store a correspondence relation between the branch line Lb and the electric appliance 3. In the appliance register 15, the electric appliance 3 is associated with not only the branch line Lb but also an appliance class for classifying a type of the electric appliance 3. The appliance class indicates a type of the electric appliance 3. In the present embodiment, the appliance class is determined based on basic classification criteria that are a use of the electric appliance 3, operation of the electric appliance 3, and connection of the electric appliance 3. In short, basically, three types of classification criteria for the appliance class are used.

A use of the electric appliance 3 (hereinafter also referred to as simply "use") means not a use relating to a function of the electric appliance 3 but a major use of a room (part of premises) in which the electric appliance 3 is used, and a name of a use of a room (name indicative of a room type) is associated with a value corresponding to the major use.

For example, the major use may include "cooking", "eating", "relaxing", "sleep or wake-up", "face washing", and "interconnection of rooms".

For example, the name indicative of the room type (hereinafter also referred to as "room name") may include "kitchen", "dining room", "living room", "bed room", "washroom", "entrance", "corridor", and "stairs".

A relation between the major use of the room and the value (room name) associated with the use of the electric appliance 3 is represented by a format of (major use, value).

For example, the use of the electric appliance 3 may be classified into (cooking, kitchen), (eating, dining room), (relaxing, living room), (sleep or wake-up, bed room), (face washing, washroom), (interconnection of rooms, entrance), (interconnection of rooms, corridor), and (interconnection of rooms, stairs).

The value allocated to the use of the electric appliance 3 is not necessarily corresponding to the room name. For example, it is sufficient that "bed room" is a room used for sleep. For example, when there are two western-style rooms and one Japanese-style room, and when a user uses these three rooms for sleep, the uses of the electric appliances 3 used in these rooms are "bed room". When a room is used for various purposes like a child room, different uses depending on time periods may be allocated to such a room, or one of various uses may be selected as the use of such a room.

The operation of the electric appliance 3 (hereinafter also referred to as simply "operation") includes the first attribute and the second attribute. The first attribute indicates whether the electric appliance 3 is to be operated only when a person is present or also when a person is absent. The second attribute indicates whether or not the electric appliance 3 is to be operated irrespective of user's preferences or seasons. The former (first attribute) is a value indicative of "presence" or "absence". The latter (second attribute) is a value indicative of "daily use" or "non daily use". The operation of the electric appliance 3 is represented by a combination of the first attribute and the second attribute. In the present embodiment, a combination of these values is represented in the hyphenated form (e.g., "presence-daily use"). In summary, the operation of the electric appliance 3 is represented in the form of "first attribute-second attribute".

The value of "presence-daily use" corresponds to lots of electric appliances 3 which include a ventilating fan which operates for a time period determined by a timer and a lighting fixture which is turned on and off in response to presence or absence of a person determined by a human sensor.

In contrast, the value of "absence-non daily use" corresponds to the electric appliances 3 which operate according to schedules (e.g., a washing machine and a rice cooker). These electric appliances 3 can automatically start and end so as to operate for a predetermined period of time irrespective of presence of persons. In other words, a period of time in which these electric appliances 3 do not operate does not always relate to presence or absence of persons. Thus, in some cases, the electric appliance 3 is operating even in a period of time in which no person is present.

The value of "presence-non daily use" corresponds to the electric appliances 3 for cooling and heating. For example, an air conditioner, an electric heater, a floor heating appliance, an electric kotatsu, an electric blanket are used when a person is present, however they are used in a particular season.

Further, the value of "absence-non daily use" corresponds to the electric appliances 3 which can operate according to schedules but are not always used daily. Hence, it is very difficult to infer the living activity of a person for a year by monitoring only the electric appliances 3 of "non daily use".

The connection of the electric appliance 3 (hereinafter also referred to as simply "connection") indicates whether connection is to be made between one electric appliance 3 and one branch line Lb or between two or more electric appliances 3 and one branch line Lb.

Note that, even when two or more electric appliances 3 are connected to the branch line Lb, normally the branch line Lb corresponds to one room and is connected to the electric appliance 3 or an outlet. Hence, the value associated with the connection of the electric appliance 3 is selected from two values "circuit level" and "room level".

The value "circuit level" means that the electric appliance 3 and the branch line Lb are connected one by one. In other words, the "circuit level" means that the electric appliance 3 occupies one branch line Lb. Examples of this electric appliance 3 include an air conditioner, a floor heating appliance, and an IH stove.

The value "room level" means that two or more electric appliances 3 are to be connected to one branch line Lb.

The appliance class is determined by a combination of the aforementioned three types of classification criteria (the use of the electric appliance 3, the operation of the electric appliance 3, and the connection of the electric appliance 3). In summary, the classification criteria of the appliance class are expressed in the form of a combination of (use, operation, connection). The living activity inference device 1 may store the classification criteria of the appliance class. The living activity inference device 1 may obtain the classification criteria through communication by use of the communication interface 112 or the communication interface 113. In this case, the living activity inference device 1 can easily adapt to a new product of the electric appliance 3.

To register the appliance class on the appliance register 15, it is necessary to in advance know types of the electric appliances 3 connected to individual branch lines Lb and locations where the electric appliances 3 are used. Hence, the registration on the appliance register 15 is preferably conducted by an installer of the electric appliance 3.

However, in some cases, only the user of the electric appliance 3 (resident of a residence) can determine the use corresponding to the location. Hence, it is preferable that the registration by the installer be treated as provisional registration so as to allow the user to modify the registration later.

Further, a property relating to the operation of the electric appliance 3 and a purpose of use of the electric appliance are information included in the type of the electric appliance 3, and thus are registered on the appliance register 15 at the same time of registering the type of the electric appliance 3 on the appliance register 15.

It is unnecessary to register, on the appliance register 15, all the electric appliances 3 used in the residence. It is sufficient that two or more electric appliances 3 of interest which are necessary for inferring the living activity are registered. The obtainer 12 obtains only the output signals of the power sensors 23 corresponding to the electric appliances 3 registered on the appliance register 15. In other words, the obtainer 12 obtains resource (electricity) consumptions (amounts of energy) of electric appliances 3 of interest.

For example, the electric appliances 3 may include a certain electric appliance 3 (e.g., refrigerator) whose energy consumption may vary but be kept not less than a predetermined amount. The certain electric appliance 3 is almost irrelevant to an activity of a user. Hence, the certain electric appliance 3 is not registered on the appliance register 15. However, if activities relating to the refrigerator (e.g., opening and closing a door of the refrigerator and storing/taking food in/from the refrigerator) should be considered, it is necessary to monitor a change in an amount of energy of the refrigerator. However, in the present embodiment, the certain electric appliance 3 is considered as irrelevant appliances.

Further, the electric appliances 3 may include a particular electric appliance 3 used for cooling and heating, and with regard to the particular electric appliance 3 it depends on thermal comfort of a user and/or an atmosphere temperature whether to operate the particular electric appliance 3. Hence, except particular cases, the particular electric appliance is not used for inference of a general living activity. In view of this, in the present embodiment, the particular electric appliance 3 for cooling and heating is also considered as the irrelevant appliance.

As described above, the electric appliance 3 which operates according to a schedule is not always relevant to the presence or absence of persons, and thus in the present embodiment this type of electric appliance 3 is also considered as the irrelevant appliance.

However, the electric appliance 3 considered as the irrelevant appliance in the present embodiment may be allowed to be treated as a relevant appliance depending on a type of activity.

The living activity inference device 1 includes the appliance operation detector 16 configured to measure a change in an amount of energy for each branch line Lb stored in the history storage 14.

The appliance operation detector 16 detects the operational state of the electric appliance 3 by use of a change in an amount of energy obtained by the obtainer 12. In other words, the appliance operation detector 16 is configured to identify the operational state of the electric appliance 3 based on the energy consumption obtained by the obtainer 12.

The operational state detected by the appliance operation detector 16 includes existence or nonexistence of standby energy, a start of working, and an end of working. Note that, the existence or nonexistence of standby energy is optional.

The start of working indicates that the electric appliance 3 has changed from a resting state to a working state. The end of working indicates that the electric appliance 3 has changed from the working state to the resting state. Therefore, once the operational state is identified as the start of working, the electric appliance 3 is considered to be in the working state until the operational state is identified as the end of working. Similarly, once the operational state is identified as the end of working, the electric appliance 3 is considered to be in the resting state until the operational state is identified as the start of working.

In the present embodiment, the appliance operation detector 16 is configured to determine that the operational state is the start of working state when the energy consumption obtained by the obtainer 12 exceeds a predetermined threshold (e.g., the amount of standby energy of the electric appliance 3). The appliance operation detector 16 is configured to determine that the operational state is the end of working when the energy consumption obtained by the obtainer 12 is equal to or less than the predetermined threshold.

The operational state of the electric appliance 3 detected by the appliance operation detector 16 is inputted into the activity inferrer 10 together with the appliance class of the electric appliance 3 registered on the appliance register 15.

The activity inferrer 10 stores a group of rules (plurality of rules). Each rule provides a conclusion indicative of an activity class defined by classification of the living activity, in response to a given condition including at least the appliance class obtained from the appliance register 15 and the operational state of the electric appliance 3 obtained from the appliance operation detector 16.

When the activity inferrer 10 receives an event such as the start of working and the end of working of the electric appliance 3, such an event is applied to the group of rules together with the appliance class of the electric appliance 3, and therefore the activity class is given.

The activity inferrer 10 infers the activity class from the change in the amount of energy of the electric appliance 3 by applying the group of rules. The activity class inferred by the activity inferrer 10 may be outputted to an external device such as a computer, or be displayed on a display (not shown) attached to the living activity inference device 1.

The activity class means a basic element of the living activity. In other words, the activity class indicates a category of the living activity. Hereinafter, the activity class per se may be treated as the living activity.

The present embodiment treats five activity classes, "sleep", "wake-up", "going out", "homecoming", and "sleepover". Note that, the activity classes may include various living activities such as housekeeping activities (e.g., "cooking", "washing", and "cleaning") and moving activities (e.g., "entering room" and "leaving room").

The activity class (living activity) inferred by the activity inferrer 10 is stored in the result storage 17 in association with the date and time indicated by the built-in clock 13. When an event such as the start of working and the end of working of the electric appliance 3 occurs, the activity inferrer 10 infers the activity class, and the activity class inferred by the activity inferrer 10 is stored in the result storage 17 together with the time stamp indicative of the date and time at which the event occurs.

The activity class stored in the result storage 17 is used when a next or later event occurs. When the operational state of the electric appliance 3 is changed after the activity class is stored in the result storage 17, the activity inferrer 10 uses a history of the activity class stored in the result storage 17 together with the operational state and the appliance class of the electric appliance 3, to infer the activity class.

The following explanation is made to a technique of inferring a latest activity class (current activity class) by use of the activity class (past activity class) stored in the result storage 17.

In the present embodiment, the activity inferrer 10 is configured to perform an inference process of determining which one of a plurality of living activities predetermined a current living activity corresponds to, based on existing information including the operational state of the electric appliance 3 identified by the appliance operation detector 16 and a past living activity. In the present embodiment, a previous activity class (previous living activity) is used as the past activity class (past living activity). The previous living activity means a result of determination in the previous inference process, that is, the current living activity determined by the previous inference process.

When the group of rules set in the activity inferrer 10 are prepared so as to give the activity class by use of only two types of conditions that are the operational state and the appliance class of the electric appliance 3, in some cases the same condition may be allocated to different activity classes.

For example, the operational states of the electric appliance 3 used for inference of "sleep" and "going out" are the same state (end of working) changing from the working to the resting. This state change is detected when an amount of energy is changed from an amount of energy supplied in working to an amount of energy in resting (e.g., the amount of standby energy). When the appliance classes of the electric appliance 3 for inference of "sleep" and "going out" are same, the same condition is allocated to different conclusions.

In summary, "sleep" and "going out" are the same in that the electric appliance 3 is not used. However, "sleep" and "going out" are different in that a resident is in a residence in "sleep" but is not in the residence in "going out". Such a difference can be seen with regard to "sleepover". Hence, "going out" and "sleepover" can be considered as another living activity "absence".

A similar problem may occur with regard to "wake-up" and "homecoming". The operational states of the electric appliance 3 relating to these activity classes are the same state (start of working) changing from the resting to the working. Hence, when the appliance classes of the electric appliance 3 used for inference of "wake-up" and "homecoming" are same, the same condition is allocated to different conclusions.

In summary, "wake-up" and "homecoming" are the same in that the electric appliance 3 is used. However, "wake-up" and "homecoming" are different in that a resident is in a residence in "wake-up" but is not in the residence in "homecoming".

As described above, there is a possibility that "sleep" and "going out" as well as "wake-up" and "homecoming" cannot be distinguished by use of only the two conditions of the operational state and the appliance class of the electric appliance 3. The present embodiment solves this type of problem by increasing types of conditions to provide the activity classes as conclusions.

The activity inferrer 10 includes an occurrence order of the plurality of activity classes (living activities) in the conditions to provide the activity class (living activity). In other words, the activity inferrer 10 is configured to store the occurrence order indicative of an order of occurrence of the plurality of living activities.

Further, the activity inferrer 10 may include, in the conditions to provide the activity class, a period time of the inference (i.e., a period of time in which an event occurs) or an elapsed period of time from the inference.

Note that, there is no need to use the occurrence order of the activity classes in all the rules included in the group of rules. When the correct conclusion cannot be obtained by use of only the two types of conditions, the occurrence order of the activity classes is used to correctly distinguish the activity classes.

In the following example, the aforementioned five activity classes ("sleep", "wake-up", "going out", "homecoming", and "sleepover") are distinguished. However, the occurrence order of the activity classes may be used for distinguishing other activity classes.

The order of occurrence regarding the five types of these activity classes is "sleep", "wake-up", "going out", "homecoming", and "sleep", or "sleep", "wake-up", "going out", "sleepover", "homecoming", and "sleep". This example is based on an assumption that all of the residents of the residence go out in daytime. This example may be not applied to every residence. However, this example is a typical example of activities of weekday, and is not exceptional. Hence, the present embodiment is described below by use of this example.

Further, the electric appliances 3 classified into the following three types of appliance classes Gm (G1 to G3) are of interest ("m" is an integer). The classification criteria for the appliance class are represented by a set of (use, operation, connection) as described above. In the following examples, the symbol "*" means that there is no need to specify the classification criterion. A value "life" relating to the major use is corresponding to one selected from the values "kitchen", "washroom", and "living room".

In this regard, a set of classification criteria for the appliance class G1 is (*, presence-daily use, circuit), a set of classification criteria for the appliance class G2 is (bedroom, presence-daily use, room), and a set of classification criteria for the appliance class G3 is (life, presence-daily use, room).

In a concrete example, it is assumed that the appliance class G1 includes an IH stove and a microwave oven, the appliance class G2 includes the electric appliances 3 connected to lighting fixtures and outlets in bedrooms, and the appliance class G3 includes the electric appliances 3 connected to lighting fixtures and outlets in three rooms which are a kitchen, a washroom, and a living room.

As described above, even if the use of the electric appliance 3 is "bedroom", it may be different from an actual room name. In this regard, the use of the electric appliance 3 is the bedroom, but the actual room names of the four rooms are a Japanese-style room, a first western-style room, a second western-style room, and a bedroom, for example.

In this regard, the appliance class G1 includes the electric appliance 3 (311) which is an IH stove and the electric appliance 3 (312) which is a microwave oven. The appliance class G2 includes the electric appliances 3 (321, 322, 323, and 324) which are installed in the Japanese-style room, the first western-style room, the second western-style room, and the bedroom, respectively. The appliance class G3 includes the electric appliances 3 (331, 332, and 333) which are installed in the kitchen, the washroom, and the living room, respectively.

Hereinafter, when the two or more electric appliances 3 are included in one appliance class Gm (G1, G2, G3), signs (identifiers) Ln (L1, L2, . . . ) ("n" is an integer) based on the branch line Lb are allocated to the electric appliances 3 included in the same appliance class Gm (G1, G2, G3), and the appliance class is connected to the sign with a colon in between to represent an individual electric appliance 3. In summary, the electric appliances 3 included in the same appliance class G are distinguished by the identifiers Ln for identifying the branch lines Lb connected to the electric appliances 3. In the present embodiment, the electric appliance 3 is identified by a combination of the appliance class Gm and the identifier Ln, that is, (Gm:Ln).

For example, the electric appliances 3 in the appliance class G1 are associated with the two branch lines Lb, and thus the electric appliance 311 which is the IH stove is identified by G1:L1, and the electric appliance 312 which is the microwave oven is identified by G1:L2. In a similar manner, the electric appliances 3 (321, 322, 323, and 324) in the appliance class G2 are associated with the four branch lines Lb, and thus are identified by G2:L1, G2:L2, G2:L3, and G2:L4, respectively. The electric appliances 3 (331, 332, and 333) in the appliance class G3 are associated with the three branch lines Lb, and thus are identified by G3:L1, G3:L2, and G3:L3, respectively.

The occurrence order of the activity classes in one day is almost fixed as with the aforementioned typical example. Hence, the activity inferrer 10 can infer the activity class accurately by referring to the latest activity class (previous activity class) or time series data of the past activity classes stored in the result storage 17.

In the above typical example, "sleep" is defined as the first activity class (living activity). Hence, the activity inferrer 10 conducts reset of the occurrence order of the activity classes before inference of "sleep". After the reset, when it is determined that the activity class is "sleep", the subsequent or later processes of inferring the activity class are conducted by use of the occurrence order of the activity classes. The reset of the occurrence order of the activity classes can be realized by deleting a history of the activity classes stored in the result storage 17. However, it is preferable to use only the activity classes, stored after the reset, of the history of the activity classes stored in the result storage 17.

It is preferable that the reset be performed immediately before the inference of "sleep". For example, after determining that the activity class is "homecoming" or "sleepover", the activity inferrer 10 performs the reset in response to detection of an event in which the electric appliance 3 associated with the inference of "sleep" is changed from an operating state (working state) to a halting state (resting state) (i.e., the electric appliance 3 associated with the inference of "sleep" is in the resting state).

For example, the reset may be performed at a point of time when an amount of power, which is one of a measurement of power transferred by the main breaker 21 (see FIG. 1) or a total of measurements of power transferred by all the branch breakers 22, becomes equal to or less than an amount of power measured as the standby power.

In an example in which the timing of the reset is easily set, the activity inferrer 10 may perform the reset at a scheduled time of a day preliminarily determined based on the date and time given by the built-in clock 13. The time for performing the reset may be selected from a scheduled time in a time period selected as night-time, a scheduled time after sunset, and a scheduled time after ordinary time of homecoming. The time for performing the reset may be changed depending on a day of the week or a season.

The inference of "sleep" is performed after a lapse of a prescribed confirmation period (e.g., 3 hours) from the time in which the electric appliance 3 associated with the inference of "sleep" is changed from the working state to the resting state. Further, a precondition for the inference of "sleep" is that the reset has been performed.

In this regard, the timing of the reset is before the inference of "sleep", and is after it is determined that the activity class is "homecoming" or "sleepover". When the completion of the reset is used as the precondition, it may be reasonable that it is determined that the activity class is "sleep" when the condition for "sleep" is satisfied.

The inference condition for "sleep" includes an event that all the electric appliances 3 in the appliance classes G1 and G2 are changed from the working state to the resting state. In other words, the inference condition for "sleep" is that all the electric appliances 3 associated with "sleep" are in the resting state. For example, the electric appliances 3 associated with "sleep" may include the electric appliances 3 (311 to 313) classified into the appliance class G1 and the electric appliances 3 (321 to 324) classified into the appliance class G2.

Transition of the electric appliance 3 from the working state to the resting state (i.e., the electric appliance 3 is in the resting state) is denoted by a symbol ":0". This symbol ":0" is connected to the aforementioned sign (Gm:Ln) for identifying the electric appliance 3 to express the condition for inferring the activity class "sleep" as follows. Note that, a symbol "$\wedge$" means an operator of logical conjunction.

The rule used in the inference of the living activity "sleep" is expressed as "(after resetting) $\wedge$ (G1:L1:0) $\wedge$ (G1:L2:0) $\wedge$ (G2:L1:0) $\wedge$ (G2:L2:0) $\wedge$ (G2:L3:0) $\wedge$ (G2:L4:0) $\wedge$ (lapse of confirmation period)".

After the reset is performed, the past living activity does not match any of the five types of activity classes ("sleep", "wake-up", "going out", "homecoming", and "sleepover").

Therefore, when the past living activity does not match any of the five types of activity classes ("sleep", "wake-up", "going out", "homecoming", and "sleepover"), the rule "(G1:L1:0) $\wedge$ (G1:L2:0) $\wedge$ (G2:L1:0) $\wedge$ (G2:L2:0) $\wedge$ (G2:L3:0) $\wedge$ (G2:L4:0) $\wedge$ (lapse of confirmation period)" associated with "sleep" would be selected.

According to the rule associated with "sleep", when all the electric appliances 3 associated with "sleep" have been in the resting state, and subsequently the confirmation period has passed from the time when all the electric appliances 3 associated with the activity class "sleep" have been in the resting state, it is inferred that the current activity class is "sleep".

In summary, when all the electric appliances 3 used for inference of "sleep" have been changed to the resting state after the reset, and subsequently have been kept in the resting state for the confirmation period, the activity inferrer 10 infers that the current activity class is "sleep". The timing of starting measurement of the confirmation period is a point of time at which all the electric appliances 3 of interest are changed to the resting state. Therefore, as long as at least one of the electric appliances 3 of interest is kept in the working state, the measurement of the confirmation period is not started.

In some cases, after all the electric appliances 3 of interest are changed to the resting state temporarily, a user sometime changes at least one or all of the electric appliances 3 to the working state. Therefore, to suspend the inference until passage of a period of time enough to definitely infer that a user is sleeping, the confirmation period is provided as described above. The confirmation period can be appropriately selected so as to achieve this purpose. For example, an optimal value of the confirmation period may be selected based on a history of sleeping time of the user. Note that, the result of inference of "sleep" is fixed after a lapse of the confirmation period from the time of occurrence of the event "sleep". However, the time of occurrence of the event "sleep" is a point of time at which the measurement of the confirmation period is started.

After the inference of "sleep", the activity inferrer 10 performs inference of "wake-up". In the inference of "wake-up", the condition that the previous inference result of the activity class is "sleep" is used in addition to the condition that any of the electric appliances 3 same as the electric appliances 3 of interest in the inference of "sleep" is changed from the resting state to the working state. When transition of the electric appliance 3 from the resting state to the working state (i.e., the electric appliance 3 is in the working state) is denoted by a symbol ":1", the condition for inference of "wake-up" is expressed as follows. Note that, a symbol "$\vee$" means an operator of logical disjunction.

The rule used in the inference of the living activity "wake-up" is expressed as "(after sleep) $\wedge$ {(G1:141:1) $\vee$ (G1:L2:1) $\vee$ (G2:L1:1) $\vee$ (G2:L2:1) $\vee$ (G2:L3:1) $\vee$ (G2:L4:1)}".

When the condition regarding the past living activity is ignored, the rule corresponding to "wake-up" is expressed as "{(G1:L1:1) $\vee$ (G1:L2:1) $\vee$ (G2:L1:1) $\vee$ (G2:L2:1) $\vee$ (G2:L3:1) $\vee$ (G2:L4:1)}".

According to the rule corresponding to "wake-up", when any one of the electric appliances 3 associated with "wake-up" is in the working state, it is inferred that the current activity class is "wake-up". The electric appliances 3 associated with "wake-up" include the electric appliances 3 (311 to 313) classified into the appliance class G1 and the electric appliances 3 (321 to 324) classified into the appliance class G2.

In the process of the inference of "wake-up", the suspension of the inference is unnecessary and therefore a period similar to the confirmation period used in the inference of "sleep" is not used. The inference of "wake-up" is started in response to the transition of any one of the electric appliances 3 of interest (the electric appliances 3 classified into the appliance class G1 or the appliance class G2) from the resting state to the working state.

After the inference of "wake-up", the activity inferrer 10 performs inference of "going out". In the present embodiment, commuting to work or school is considered as "going out", and it is assumed that all the residents in the residence "go out" after "wake-up".

The condition for the inference of "going out" is almost the same as the condition for the inference of "sleep", but is different from the condition for the inference of "sleep" in the activity class used as the precondition and that the state of the electric appliance 3 of the appliance class G3 are added to the condition for the inference of "going out". As easily understood, the operational state of the electric appliance 3 of the appliance class G3 can be used in the condition for the inference of "sleep". Hence, it is very difficult to distinguish between "sleep" and "going out" by using only the operational state of the electric appliance 3 in the condition for the inference. In conclusion, it is possible to distinguish between "sleep" and "going out" by adding the condition that "going out" occurs after "wake-up" as the precondition for "going out". The condition for the inference of "going out" is expressed as follows.

The rule used in the inference of the living activity "going out" is expressed as "(after wake-up) ∧ (G1:L1:0) ∧ (G1:L2:0) ∧ (G2:L1:0) ∧ (G2:L2:0) ∧ (G2:L3:0) ∧ (G2:L4:0) ∧ (G3:L1:0) ∧ (G3:L2:0) ∧ (G3:L3:0) ∧ (lapse of confirmation period)".

When the condition regarding the past living activity is ignored, the rule corresponding to "going out" is expressed as "(G1:L1:0) ∧ (G1:L2:0) ∧ (G2:L1:0) ∧ (G2:L2:0) ∧ (G2:L3:0) ∧ (G2:L4:0) ∧ (G3:L1:0) ∧ (G3:L2:0) ∧ (G3:L3:0) ∧ (lapse of confirmation period)".

As apparent from the above, in the rule corresponding to "going out", when a situation where all the electric appliances 3 associated with "going out" are kept in the resting state continues for the confirmation period from the time when all the electric appliances 3 associated with "going out" are changed in the resting state, it is inferred that the activity class is "going out". The electric appliances 3 associated with "going out" include the electric appliances 3 (311 to 313) classified into the appliance class G1, the electric appliances 3 (321 to 324) classified into the appliance class G2, and the electric appliances 3 (331 to 333) classified into the appliance class G3.

In the aforementioned condition, the confirmation period is used in a similar manner to the inference of "sleep". It is sufficient that the confirmation period is a period enough to confirm that the activity class is "going out". For example, the confirmation period may be 30 minutes. The reason for using the confirmation period is similar to the case of "sleep". For example, a user may return home to take things left behind. Hence, the inference is suspended until passage of a period of time enough to definitely infer that the activity class is "going out". Note that, as with the case of "sleep", the time of occurrence of the event "going out" is a point of time at which the measurement of the confirmation period is started. In the inference of "going out", an additional condition that a predetermined period does not pass from the inference of "wake-up" may be added. The confirmation period in the rule corresponding to "going out" may be same as or different from the confirmation period in the rule corresponding to "sleep".

After the inference of "wake-up", the activity inferrer 10 performs inference of "homecoming" or "sleepover".

In the inference of "homecoming", the condition that the previous inference result of the activity class is "going out" is used in addition to the condition that any of the electric appliances 3 same as the electric appliances 3 of interest in the inference of "going out" is changed from the resting state to the working state (i.e., the electric appliance 3 is in the working state).

The condition for inference of "homecoming" is almost the same as the condition for inference of "wake-up". In the condition of this inference, the operational states of the electric appliances 3 of the appliance class G3 are used as with "going out". Additionally, "going out" is used as the precondition.

The electric appliances 3 of the appliance class G3 can be used for the inference of "wake-up", and hence it is difficult to distinguish between "homecoming" and "wake-up" only by adding the operational states of the electric appliances 3 of the appliance class G3. In view of this, a condition that "homecoming" is next to "going out" is used as a precondition for "homecoming". Therefore, it is possible to clearly distinguish between "wake-up" and "homecoming". The condition for the inference of "homecoming" is expressed as follows.

The rule used in the inference of the living activity "homecoming" is expressed as "(after going out) ∧ {(G1:141:1) ∨ (G1:L2:1) ∨ (G2:L1:1) ∨ (G2:L2:1) ∨ (G2:L3:1) ∨ (G2:L4:1) ∨ (G3:L1:1) ∨ (G3:L2:1) ∨ (G3:L3:1)}".

When the condition regarding the past living activity is ignored, the rule corresponding to "homecoming" is expressed as "{(G1:L1:1) ∨ (G1:L2:1) ∨ (G2:L1:1) ∨ (G2:L2:1) ∨ (G2:L3:1) ∨ (G2:L4:1) ∨ (G3:L1:1) ∨ (G3:L2:1) ∨ (G3:L3:1)}".

In summary, according to the rule corresponding to "homecoming", when any one of the electric appliances 3 associated with "homecoming" is in the working state, it is inferred that the activity class is "homecoming". The electric appliances 3 associated with "homecoming" include the electric appliances 3 (311 to 313) classified into the appliance class G1, the electric appliances 3 (321 to 324) classified into the appliance class G2, and the electric appliances 3 (331 to 333) classified into the appliance class G3.

As described above, the activity inferrer 10 performs the inference with regard to each of the four types of activity classes "sleep", "wake-up", "going out", and "homecoming", based on whether the aforementioned conditions are fulfilled.

The activity class inferred by the activity inferrer 10 is stored in the result storage 17 together with the date and time. With regard to "sleep" and "going out", the result of the inference is fixed after a lapse of the confirmation period. However, the time at which the event occurs is the time of starting the measurement of the confirmation period. Hence, after the result of the inference is obtained, the time of starting the measurement of the confirmation period is stored in the result storage 17 together with the resultant activity class. With regard to "wake-up" and "homecoming", the time at which the result of the inference is obtained is stored in the result storage 17 together with the resultant activity class.

Note that, in the aforementioned example, the electric appliances 3 selected from the electric appliances of the appliance classes G1, G2, and G3 are used in the condition for the inference of "going out". It is considered that appliances for cooking and heating may be turned off when residents "go out". Hence, the operational states of the appliances for cooking and heating may be used in the condition for inference of "going out". Similarly, the operational states of the appliances for cooking and heating may be used in the condition for inference of "wake-up".

Additionally, in the condition for the inference of the activity class, a season based on the date and time indicated by the built-in clock 13 may be considered. For example, priorities of electric appliances 3 (or the branch lines Lb) used in the condition for the inference may be changed in accordance with a season. In particular, the appliances for cooling and heating are used in a different way depending on a season. For example, in a season (e.g., summer and winter) in which the appliance for cooling and heating is used, the energy consumption of the appliance for cooling and heating may be monitored, and in a season (e.g., spring and autumn) in which the appliance for cooling and heating is not used, the energy consumption of the appliance for cooling and heating may be not used in the condition for the inference.

By accumulating the results of the inference of the activity classes in the result storage 17, a distribution of the time of the inference can be obtained for each activity class. FIGS. 2 to 5 show examples of distributions of the time calculated for the activity classes "sleep", "wake-up", "going out", and "homecoming", respectively. By calculating such distributions, it is possible to understand the activity time of the user. With regard to the activity class of interest, the time corresponding to a peak of the distribution is considered as standard activity time of the user.

Figure 2:
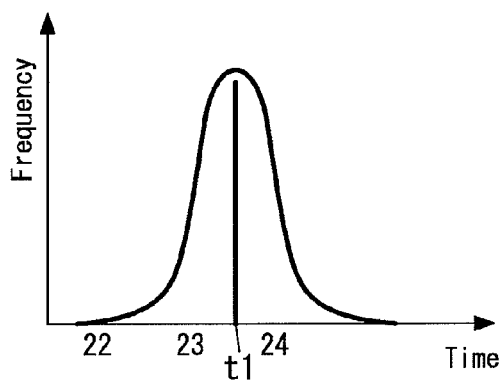
FIG. 2 is an explanatory diagram illustrating operation of the above living activity inference device.
Figure 3:
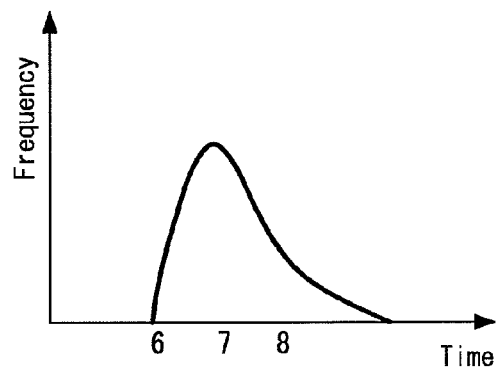
FIG. 3 is an explanatory diagram illustrating operation of the above living activity inference device.
Figure 4:
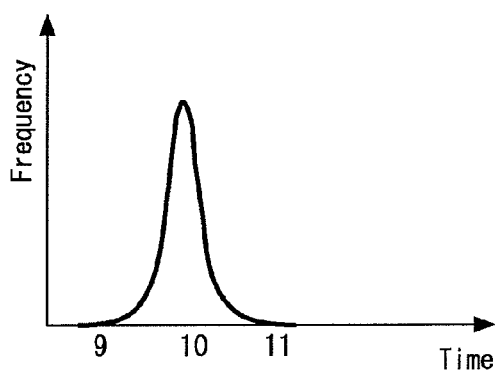
FIG. 4 is an explanatory diagram illustrating operation of the above living activity inference device.
Figure 5:
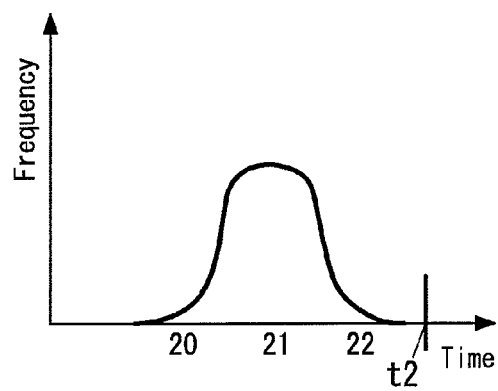
FIG. 5 is an explanatory diagram illustrating operation of the above living activity inference device.

For example, the distribution of the time of sleep shown in FIG. 2, a peak appears at time t1, and thus the standard time is about 23:40 indicated by the time t1. Further, the lower limit and the upper limit of the distribution of the activity class are considered as the earliest activity time and the latest activity time of the user regarding this activity class, respectively. For example, the distribution of the time of homecoming shown in FIG. 5, time t2 is the latest activity time, and thus the latest time of homecoming is about 22:20 indicated by the time t2.

When the distributions of the time regarding the activity classes as shown in FIGS. 2 to 5 are obtained, it is possible to infer that the user does not return home when the latest activity time regarding "homecoming" is past. Therefore, in such a case, the activity inferrer 10 infers that the activity class is "sleepover". In the case of one day sleepover, it is preferable that the precondition include "going out" in addition to the inference based on the time. As for a long business trip or a long private trip, the results of the inference may show "sleepover" consecutively, and thus it is preferable that the precondition for "sleepover" include "reset". Hence, the condition for the inference of "sleepover" is expressed as follows.

The rule used for inference of the living activity "sleepover" is expressed as "{(after reset) V (after going out)} Λ (past the latest activity time of "homecoming")".

When the condition relating to the past living activity is removed and the condition relating to the electric appliances 3 is added, the rule corresponding to "sleepover" is expressed as "(G1:L1:0) Λ (G1:L2:0) Λ (G2:L1:0) Λ (G2:L2:0) Λ (G2:L3:0) Λ (G2:L4:0) Λ (G3:L1:0) Λ (G3:L2:0) Λ (G3:L3:0) Λ (latest activity time of "homecoming" is past)".

According to the rule corresponding to "sleepover", when all the electric appliances 3 associated with "sleepover" and when the current time is past the latest activity time of "sleepover", it is inferred that the current activity class is "sleepover". The electric appliances 3 associated with "sleepover" include the electric appliances 3 (311 to 313) classified into the appliance class G1, the electric appliances 3 (321 to 324) classified into the appliance class G2, and the electric appliances 3 (331 to 333) classified into the appliance class G3. Note that, the electric appliance 3 associated with "sleepover" is same as the electric appliance 3 associated with "going out" in many cases. Note that, by using a condition (inference of "homecoming" does not succeed but standard time of "sleep" is past) instead of the condition (latest activity time of "homecoming" is past), it can be inferred that the current activity class is "sleepover".

FIG. 6 shows a group of aforementioned rules for inference of the respective activity classes "sleep", "wake-up", "going out", "homecoming", and "sleepover" as described above.

Hereinafter, the activity inferrer 10 is described in detail. In the present embodiment, the activity inferrer 10 is configured to perform an inference process of determining which one of a plurality of living activities predetermined a current living activity corresponds to, based on existing information including the operational state of the electric appliance 3 identified by the appliance operation detector 16 and a past living activity. The activity inferrer 10 performs the inference process at a predetermined timing. For example, the predetermined timing may be a point of time at which any of the states (e.g., the working state and the resting state) of the electric appliances 3, or a point of time at which a predetermined time has passed from the time of performing the inference process.

For example, the plurality of living activities predetermined include "sleep", "wake-up", "going out", "homecoming", and "sleepover". The activity inferrer 10 is configured to store a plurality of rules individually corresponding to the plurality of living activities ("sleep", "wake-up", "going out", "homecoming", and "sleepover").

Each rule defines a condition regarding the operational state of the electric appliance 3 associated with the living activity corresponding to the rule.

The rule corresponding to "sleep" is defined such that the current living activity is "sleep" when all the electric appliances 3 (the electric appliances 3 classified into the appliance class G1 or G2) associated with "sleep" are in the resting state, and the confirmation period passes from the time when all the electric appliances 3 associated with "sleep" are in the resting state. In this regard, the electric appliance 3 associated with "sleep" is an electric appliance 3 which is not used during sleep, for example. In other words, the electric appliance 3 associated with the living activity means an electric appliance 3 which is not used in the associated living activity. Note that, after a lapse of the confirmation period from the time at which the activity inferrer 10 determines that all the electric appliances 3 associated with "sleep" are in the resting state, the activity inferrer 10 determines that the confirmation period has elapsed from the time at which all the electric appliances 3 associated with "sleep" are in the resting state.

The rule corresponding to "wake-up" is defined such that the current living activity is "wake-up" when any one of the electric appliances 3 (the electric appliances 3 classified into the appliance class G1 or G2) associated with "wake-up" is in the working state. In this regard, the electric appliance 3 associated with "wake-up" is an electric appliance 3 which is used at the time of wake-up, for example. In other words, the electric appliance 3 associated with the living activity means an electric appliance 3 which is used in the associated living activity.

The rule corresponding to "going out" is defined such that the current living activity is "going out" when all the electric appliances 3 (the electric appliances 3 classified into the appliance class G1, G2, or G3) associated with "going out" are in the resting state, and the confirmation period passes from the time when all the electric appliances 3 associated with "going out" are in the resting state. In this regard, the electric appliance 3 associated with "going out" is an electric appliance 3 which is not used during going out, for example. In other words, the electric appliance 3 associated with the living activity means an electric appliance 3 which is not used in the associated living activity. Note that, after a lapse of the confirmation period from the time at which the activity inferrer 10 determines that all the electric appliances 3 associated with "going out" are in the resting state, the activity inferrer 10 determines that the confirmation period has elapsed from the time at which all the electric appliances 3 associated with "going out" are in the resting state.

The rule corresponding to "sleepover" is defined such that the current living activity is "sleepover" when all the electric appliances 3 (the electric appliances 3 classified into the appliance class G1, G2, or G3) associated with "sleepover" is in the resting state and the current time has been past the latest activity time of "homecoming". In this regard, the electric appliance 3 associated with "sleepover" is an electric appliance 3 which is not used during sleepover, for example. In other words, the electric appliance 3 associated with the living activity means an electric appliance 3 which is not used in the associated living activity.

The rule corresponding to "homecoming" is defined such that the current living activity is "homecoming" when any one of the electric appliances 3 (the electric appliances 3 classified into the appliance class G1, G2, or G3) associated with "homecoming" is in the working state. In this regard, the electric appliance 3 associated with "homecoming" is an electric appliance 3 which is used at the time of homecoming, for example. In other words, the electric appliance 3 associated with the living activity means an electric appliance 3 which is used in the associated living activity.

Each of the rule regarding "sleep", the rule regarding "going out", and the rule regarding "sleepover" is a logical conjunction rule. The logical conjunction rule means a rule which determines that the current living activity is a living activity corresponding to the logical conjunction when all of a plurality of conditions regarding the existing information are fulfilled.

According to the logical conjunction rule, when any one of the plurality of conditions regarding the existing information is not fulfilled, the determination process is terminated. In view of this, the activity inferrer 10 is configured to allocate priorities to the plurality of conditions of the logical conjunction rule individually. The activity inferrer 10 is configured to determine whether the existing information fulfills one selected from the plurality of conditions in order of the priorities from highest to lowest.

In consideration of promoting efficiency of the determination process, it is preferable that the condition be subjected to the determination of whether the condition is fulfilled in order of ease of determination of whether the condition is fulfilled. For example, the activity inferrer 10 is configured to set the priorities of the plurality of conditions such that a condition regarding the electric appliance 3 which has a greater difference in the energy consumption between the working state and the resting state has a higher priority. Alternatively, the activity inferrer 10 may be configured to set the priorities such that a higher priority is assigned to a condition in which a probability that the condition is fulfilled is lower.

Each of the rule regarding "wake-up" and the rule regarding "homecoming" is a logical disjunction rule. The logical disjunction rule means a rule which determines that the current living activity is a living activity corresponding to the logical disjunction when any one of a plurality of conditions regarding the existing information is fulfilled.

According to the logical disjunction rule, when any one of the plurality of conditions regarding the existing information is fulfilled, the determination process is terminated. In view of this, the activity inferrer 10 is configured to allocate priorities to the plurality of conditions of the logical disjunction rule individually. The activity inferrer 10 is configured to determine whether the existing information fulfills one selected from the plurality of conditions in order of the priorities from highest to lowest.

In consideration of promoting efficiency of the determination process, it is preferable that the condition be subjected to the determination of whether the condition is fulfilled in order of ease of determination of whether the condition is fulfilled. In each of the rule regarding "wake-up" and the rule regarding "homecoming", all of the plurality of conditions regarding the existing information are conditions regarding the operational states of the electric appliances 3. Hence, the activity inferrer 10 is configured to set the priorities of the plurality of conditions such that a condition regarding the electric appliance 3 which has a greater difference in the energy consumption between the working state and the resting state has a higher priority.

In consideration of promoting efficiency of the determination process, it is preferable that the condition be subjected to the determination of whether the condition is fulfilled in descending order of probability that the condition is fulfilled. In view of this, the activity inferrer 10 may be configured to set the priorities such that a higher priority is assigned to a condition in which a probability that the condition is fulfilled is higher.

Note that, the activity inferrer 10 is configured to perform "reset" to initialize the living activity after "homecoming" and before "sleep".

The rule corresponding to "reset" is defined such that the living activity is initialized when all the electric appliances 3 associated with "sleep" (the electric appliances 3 classified into the appliance class G1 or G2) are in the resting state. When the living activity is initialized, the past living activity is not any of "sleep", "wake-up", "going out", "homecoming", and "sleepover".

In the present embodiment, the inference process includes a selection process and the determination process.

The activity inferrer 10 is configured to, in the selection process, select from the plurality of rules a rule to be used in the determination process, depending on the past living activity.

The activity inferrer 10 is configured to store an occurrence order indicative of an order of occurrence of the plurality of living activities. In the present embodiment, for example, the occurrence order is an order of "sleep", "wake-up", "going out", "sleepover", and "homecoming". Note that, in some cases, the living activity "sleepover" does not occur. Hence, the living activity next to "going out" is "sleepover" or "homecoming".

The activity inferrer 10 is configured to, in the selection process, select the rule corresponding to a living activity next to the past living activity in the occurrence order, as the rule to be used in the determination process.

The activity inferrer 10 is configured to, in the determination process, determine which one of the plurality of living activities the current living activity corresponds to, based on the rule selected through the selection process and the existing information.

In other words, the activity inferrer 10 checks whether the existing information fulfills the condition defined by the rule. When the existing information fulfills the condition defined by the rule, the activity inferrer 10 determines that the current living activity is the living activity corresponding to the rule. When the existing information does not fulfill the condition defined by the rule, the activity inferrer 10 determines that the current living activity is not the living activity corresponding to the rule.

Figure 7:
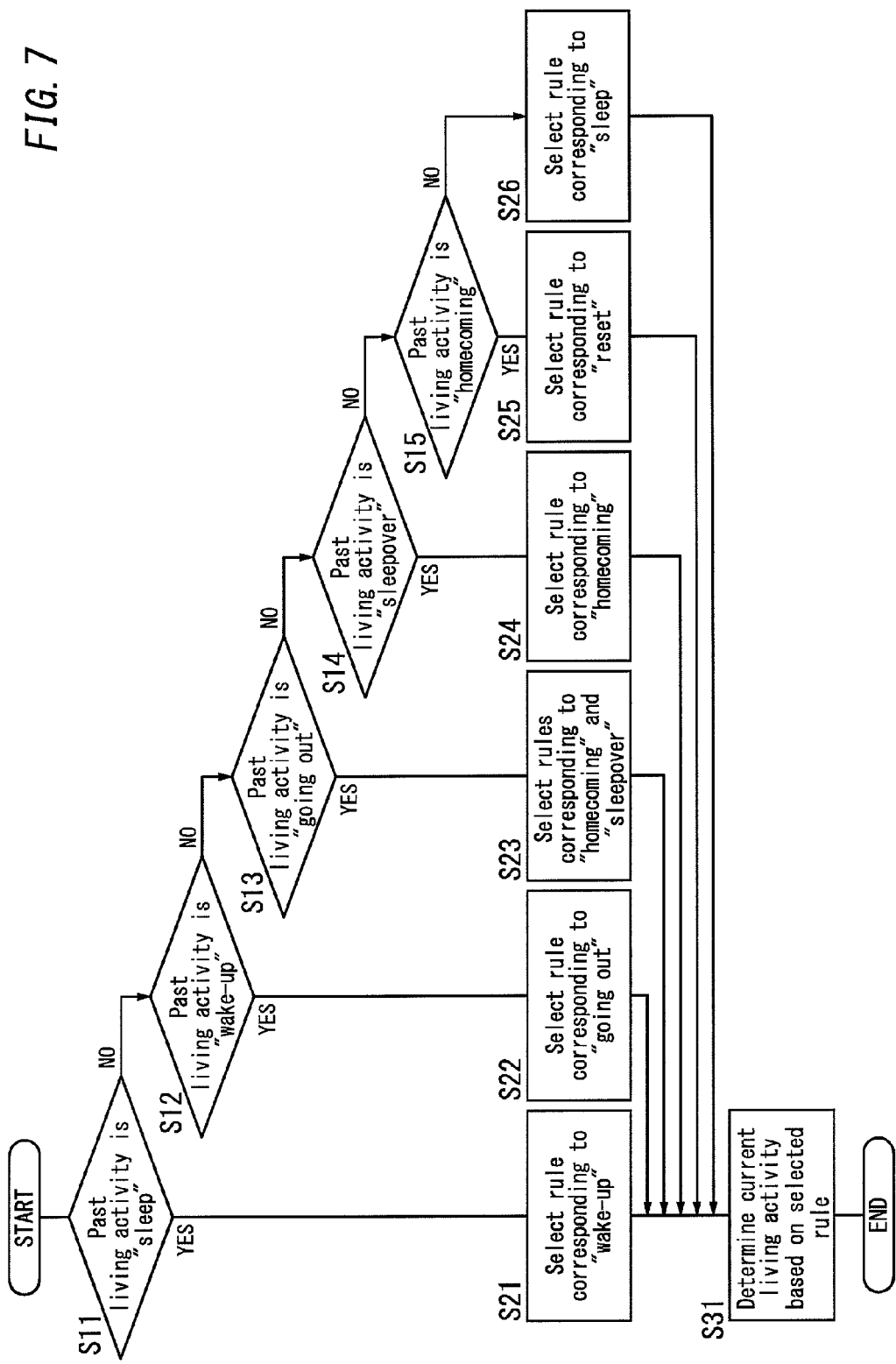
FIG. 7 is a flowchart illustrating an inference process of the above living activity inference device.

Hereinafter, the operation of the activity inferrer 10 is described with reference to a flowchart shown in FIG. 7.

First, the activity inferrer 10 determines which one of the plurality of living activities predetermined the past living activity is (S11 to S15).

When determining that the past living activity is "sleep" (S11: YES), the activity inferrer 10 selects the rule corresponding to "wake-up" which is the living activity next to "sleep" (S21). Thereafter, the activity inferrer 10 executes a process using the selected rule (the rule corresponding to "wake-up") (S31). Consequently, when any one of the electric appliances 3 associated with "wake-up" is in the working state, the activity inferrer 10 determines that the current living activity is "wake-up".

When determining that the past living activity is "wake-up" (S12: YES), the activity inferrer 10 selects the rule corresponding to "going out" which is the living activity next to "wake-up" (S22). Thereafter, the activity inferrer 10 executes a process using the selected rule (the rule corresponding to "going out") (S31). Consequently, when all the electric appliances 3 associated with "going out" are in the resting state and the confirmation period elapses from the time at which all the electric appliances 3 associated with "going out" are in the resting state, the activity inferrer 10 determines that the current living activity is "going out".

When determining that the past living activity is "going out" (S13: YES), the activity inferrer 10 selects the rules corresponding to "sleepover" and "homecoming" which are the living activities next to "going out" (S23). Thereafter, the activity inferrer 10 executes processes using the selected rules (the rule corresponding to "sleepover" and the rule corresponding to "homecoming") (S31). Consequently, when any one of the electric appliances 3 associated with "homecoming" is in the working state, the activity inferrer 10 determines that the current living activity is "homecoming". Alternatively, when all the electric appliances 3 associated with "sleepover" are in the resting state and the current time is past the latest activity time of "homecoming", the activity inferrer 10 determines that the current living activity is "sleepover".

When determining that the past living activity is "sleepover" (S14: YES), the activity inferrer 10 selects the rule corresponding to "homecoming" which is the living activity next to "sleepover" (S24). Thereafter, the activity inferrer 10 executes the process using the selected rule (the rule corresponding to "homecoming") (S31). Consequently, when any one of the electric appliances 3 associated with "homecoming" is in the working state, the activity inferrer 10 determines that the current living activity is "homecoming".

When determining that the past living activity is "homecoming" (S15: YES), the activity inferrer 10 selects the rule corresponding to "reset" (S25). Thereafter, the activity inferrer 10 executes a process using the selected rule (the rule corresponding to "reset") (S31). Consequently, when all the electric appliances 3 associated with "sleep" are in the resting state, the activity inferrer 10 initializes the living activity. Therefore, the past living activity is not any of "sleep", "wake-up", "going out", "homecoming", and "sleepover".

When determining that the past living activity is not any of "sleep", "wake-up", "going out", "homecoming", and "sleepover" (S15: NO), the activity inferrer 10 selects the rule corresponding to "sleep" (S26). Thereafter, the activity inferrer 10 executes a process using the selected rule (the rule corresponding to "sleep") (S31). Consequently, when all the electric appliances 3 associated with "sleep" are in the resting state and the confirmation period elapses from the time at which all the electric appliances 3 associated with "sleep" are in the resting state, the activity inferrer 10 determines that the current living activity is "sleep".

Note that, initialization of the living activity need not be performed always. Instead, "sleep" may be selected as the living activity next to "homecoming". In this case, when determining that the past living activity is "homecoming" (S15: YES), the activity inferrer 10 selects the rule corresponding to "sleep", and executes the process using the selected rule (the rule corresponding to "sleep").

When frequency distributions of time for respective activity classes (living activities) as shown in FIG. 2 to FIG. 5 are obtained from the activity classes accumulated in the result storage 17, a time period of a user's activity for each activity class can be inferred. Thus, the activity inferrer 10 may use the time period calculated from the frequency distribution in the inference of the activity class.

For example, in addition to the conditions of the respective living activities described above, the time period delimited by the earliest and latest activity time which is obtained from the frequency distribution is used. When the condition regarding the activity class to be inferred is fulfilled in the corresponding time period, it is determined that the current activity class is the activity class to be inferred.

By using the time periods together with the conditions of the activity classes as described above, the accuracy of the inference of the activity class can be improved.

In the aforementioned operation example, in the inference of "sleep", "reset" is used as a precondition. When a time period of sleep is known, "reset" may not be used but the time period of sleep may be used. In the condition for the inference of "sleep" as described above, (after reset) may be replaced with (time period for sleep).

In the aforementioned operation example, an event in which the electric appliance 3 of the appliance class G1 or G2 is changed to the working state (i.e., the electric appliance 3 of the appliance class G1 or G2 is in the working state) is used as a condition for the inference of "wake-up", and an event in which the electric appliance 3 of the appliance class G1, G2 or G3 is changed to the working state (i.e., the electric appliance 3 of the appliance class G1, G2 or G3 is in the working state) is used as a condition for the inference of "homecoming". However, in each case, the logical disjunction of two or more events each in which the electric appliance 3 is changed to the working state (i.e., the electric appliance 3 is in the working state) is used. Hence, there is no need to always monitor all the electric appliances 3.

In a premise included in the condition for the inference of "wake-up" or "homecoming", it is sufficient to detect a change of the electric appliance 3 from the resting state to the working state (i.e., whether the electric appliance 3 is in the working state) for each of the electric appliances 3 of interest. It is considered that such detection is easier as a change in an amount of energy is greater.

Hence, it is preferable that the appliance operation detector 16 read out time-series data of an amount of energy regarding the electric appliance 3 of interest from the history storage 14 and use the time-series data in descending order of a change in the amount of energy at "wake-up" or "homecoming" within a past predetermined period.

By preferentially detecting a change in the operational state of the electric appliance 3 showing a large change in the amount of energy, it is easy to determine whether the premise included in the condition of the inference of "wake-up" or "homecoming" is fulfilled. Therefore, the accuracy of the inference of the activity class can be improved.

The appliance operation detector 16 sequentially reads out the time-series data of amounts of energy of the respective electric appliances 3 from the history storage 14 and infers the operational states of the electric appliances 3. The activity inferrer 10 sequentially determines whether the premises included in the conditions for inference of the activity classes are fulfilled. Hence, when the operational states of lots of electrical appliances 3 are included in the condition for the inference of "wake-up" or "homecoming", it may take a long time to lead a conclusion in some cases.

In view of this, it is preferable that, by use of the time-series data of an amount of energy stored in the history storage 14, the order of presumption be modified so that the electric appliances 3 are subjected, in descending order of the number of times that the electric appliance 3 gives conclusion of the inference of "wake-up" or "homecoming" in a past predetermined period, to presumption of whether the electric appliance 3 is changed to the working state. By doing this process, an amount of processing necessary for the inference of "wake-up" or "homecoming" may be reduced and time necessary for the inference may be shortened.

As described above, the previous conditions for "wake-up", "going out", "homecoming", and "sleepover" are that the past living activity is "sleep", that the past living activity is "wake-up", that the past living activity is "going out", and that the past living activity is "going out", respectively. The precondition for "sleep" is that the past living activity is "reset".

Therefore, even when the event "going out" does not occur, no problem occurs in determination of the subsequent activity class (living activity). As apparent from this, it is considered that, by using these five activity classes (living activities) as basic activity classes (living activities) in order to determine other activity classes (living activities), determination of the other activity classes (living activities) can be conducted precisely.

Hereinafter, an example for inference of activity classes with regard to housekeeping such as "preparation of meals" and "cleaning" is described. These activity classes of the housekeeping are used only while a resident is at home. Thus, a precondition for such an activity class is that the resident is at home. Further, such an event occurs only within a time period when the resident stays awake. Hence, as apparent from above, only a time period from "wake-up" to "going out" and a time period from "homecoming" to "sleep" are of interest.

The activity class "preparation of meals" or "cleaning" is inferred based on whether the electric appliance 3 corresponding to the activity class is used in the aforementioned time period. For example, a microwave oven or an IH stove is used in "preparation of meals". Such an electric appliance 3 is always connected to a specific branch line Lb or occupies the specific branch line Lb. Hence, it is possible to monitor the operational state of the electric appliance 3 of interest by use of the output signal from the power sensor 23. In summary, when the microwave oven or the IH stove is in the working state in the time period in which the resident is at home, it is inferred that the current activity class is "preparation of meals".

However, there may be a case where the microwave oven or the IH stove alone is used for a different purpose from "preparation of meals". Therefore, when the microwave oven and the IH stove are sequentially in the working state within a time period prescribed as a period for preparation of meals, it may be inferred that the current activity class is "preparation of meals". When meals are prepared by thawing frozen foods by using only the microwave oven, the IH stove is not used in some cases. In contrast, in some cases meals are prepared by use of only the IH stove without using the microwave oven. Hence, it is preferable to decide an operating time of the microwave oven or the IH stove in view of these cases.

The electric appliance 3 used for "cleaning" is a vacuum cleaner. The branch line Lb to be used by the vacuum cleaner is selected from two or more branch lines, and thus it is very difficult to uniquely specify the branch line Lb to be used by the vacuum cleaner. Further, an energy consumption of the vacuum cleaner shows a great variation width, and therefore it is difficult to distinguish the vacuum cleaner from other electric appliances 3 by use of only a change of electricity.

In view of consideration of usage conditions of the vacuum cleaner, the vacuum cleaner is used while moved to various places in the house, and therefore it is considered that the vacuum cleaner is connected to an outlet not used normally and the vacuum cleaner is connected to a different outlet when moved to a different place. In view of this, with regard to the vacuum cleaner, the branch lines Lb which have possibilities to be connected to the vacuum cleaner are selected, and a condition is that an amount of energy within a range of amounts of energy corresponding to use of the vacuum cleaner is detected at any of the selected branch lines Lb and the branch lines Lb to supply such an amount of energy are switched with in a predetermined time period. In summary, in a condition for inference of "cleaning", a time variation of electricity regarding the plurality of branch lines Lb is used.

Further, the vacuum cleaner is used while connected to the outlet. While the vacuum cleaner is not connected to the outlet, this outlet does not provide standby energy. When one branch line Lb is connected to one room, with regard to the living room, this branch line Lb may provide standby energy for lighting fixtures and television receivers. With regard to other places such as the corridor, the stairs, and the entrance, it is considered that standby energy is not provided. Hence, with regard to the branch line Lb which does not provide standby energy, when the branch line Lb provides energy corresponding to use of the cleaner and a continuation period does not exceed a predetermined period defined as an operation period of the vacuum cleaner, it is inferred that the current activity class is "cleaning".

The branch line Lb providing standby energy is connected to other electric appliances 3, and thus there is a possibility that the use of the cleaner cannot be distinguished from the use of the other electric appliances 3. In this case, the inference of "cleaning" is conducted by use of a time variation of an amount of energy at two or more branch lines Lb as described above. In this regard, it is preferable that the branch lines Lb of interest include at least one branch line Lb which does not provide standby energy.

With regard to each of the activity classes such as "preparation of meals" and "cleaning" described above, by using a precondition that the current time is within a period in which the resident is at home, the accuracy of the inference can be higher than that in the case where only a change in energy is used.

When the activity class "washing" is used, a washing machine is connected to a certain branch line Lb, and hence the operational state of the washing machine is monitored by use of the output signal from the power sensor 23. When the washing machine is configured to operate according to a schedule, the washing machine can operate even while the resident is not at home. In this case, a precondition that the resident is at home is not included in the condition for inference of "washing".

As described above, in a case of the inference for the five types of activity classes "sleep", "wake-up", "going-out", "homecoming", and "sleepover" defining the basic activity classes, the conclusion of the inference indicative of the past activity class is used as the precondition. With regard to the condition for the inference of the other activity classes, the time period in which the resident is at home is calculated from information regarding the basic activity classes, and a precondition that the current time is within this time period is used. By using information obtained based on the information regarding the basic activity classes as the precondition in addition to the output signal from the power sensor 23, the accuracy of the inference of the activity class can be improved.

In the aforementioned embodiment, the activity class is inferred based on information obtained by monitoring a change of energy consumed by the electric appliance 3. However, a flow sensor which measures at least one of a water consumption and a gas consumption may be provided, and a change of a flow volume measured by the flow sensor can be used in the condition for the inference in addition to a change of the energy. In this case, the history storage 14 stores time-series data of a flow volume per measurement time in addition to the time-series data of an amount of energy per measurement time. Further, the activity inferrer 10 uses a change of a flow volume as the condition for the inference of the activity class in addition to a change of energy. In summary, for the inference of the activity class, the operational state of at least one of a water-use appliance and a gas appliance is included in the precondition.

By using a water consumption and/or a gas consumption in addition to an energy consumption as the condition for the inference of the activity class, "preparation of meals" can be inferred even when the IH stove is not provided, and the activity class, which cannot be inferred by use of only energy, such as "bath" can be also inferred. Further, even with regard to the activity class which can be inferred by use of only energy, the accuracy of the inference can be improved.

Labels indicative of individual activity classes are given to the activity classes which are inferred by the activity inferrer 10 in the aforementioned manner. Thus, the activity classes for one day are expressed as time-series of labels. Basic information for providing various services such as watching elderly's houses, advising as to energy saving activities, and advising as to healthcare can be obtained from such time-series of labels indicative of the activity classes.

For example, based on the time distribution of "sleep" shown in FIG. 2, it is inferred that the time t1 at which the peak occurs is a typical bedtime of the user. Therefore, after the typical bedtime is calculated, the inferred bedtime is recorded every day, and a trend of a change in a difference between the typical bedtime and the inferred bedtime is calculated. Thereby, it is possible to control a variation of the bedtime. For example, when the calculated trend shows that the bedtime is later and later, this information can be applied to services of providing a devices of energy saving activities and healthcare.

Additionally, the activity classes for a day are expressed by the time-series of the labels, and thus an amount of date is remarkably reduced relative to a case where an amount of energy is managed, and a processing load is reduced. Hence, the aforementioned function can be implemented by an embedded system. Further, according to the aforementioned configuration, the activity class is inferred based on information obtained by measuring a change of energy by the power sensor 23 for each branch line Lb, and thus a device which is provided to each room, such as a camera and a human sensor is unnecessary for the inference of the activity class.

Hence, installation can be facilitated. In addition, there is an advantage that in contrast to a case of using cameras an emotional strain of a user can be reduced. Moreover, certain rules which are of the group of rules and are corresponding to necessary active classes may be treated as valid rules. In this case, for example, the inference of only wake-up and sleep can be conducted. Thus, the number of classes of the living activity can be changed.

As described above, the living activity inference device 1 of the present embodiment includes the appliance register 15, the obtainer 12, the appliance operation detector 16, the activity inferrer 10, and the result storage 17. A plurality of electric appliances 3 of interest selected from the electric appliances 3 used in the residence are registered on the appliance register 15. The obtainer 12 obtains amounts of energy consumed by the electric appliances 3 registered on the appliance register 15. The appliance operation detector 16 detects the operational states of the individual electric appliances 3 by use of changes of the amounts of energy obtained by the obtainer 12. The activity inferrer 10 stores the group of rules each of which provides a conclusion indicative of an activity class defined by classification of the living activity, in response to a given condition including at least the operational state of the electric appliance 3, and infers the activity class by applying the operational states of the electric appliances 3 detected by the appliance operation detector 16 to the condition of the rule selected from the group of rule. The result storage 17 stores the activity class inferred by the activity inferrer 10 together with the date and time. The group of rules includes at least one rule having a condition including the activity class. In a process of inferring the activity class, the activity inferrer 10 applies the result of the inference indicative of the past activity class read out from the result storage 17 to the condition of the rule together with the operational state of the electric appliance 3.

In other words, the living activity inference device of the present embodiment includes the following first feature. In the first feature, the living activity inference device 1 includes: an obtainer 12 configured to obtain an energy consumption of an electric appliance 3; an appliance operation detector 16 configured to identify an operational state of the electric appliance 3 based on the energy consumption obtained by the obtainer 12; and an activity inferrer 10 configured to perform an inference process of determining which one of a plurality of living activities predetermined a current living activity corresponds to, based on existing information including the operational state of the electric appliance 3 identified by the appliance operation detector 16 and a past living activity.

Further, the living activity inference device 1 of the present embodiment includes the following second feature in addition to the first feature. In the second feature, the activity inferrer 10 is configured to store a plurality of rules individually corresponding to the plurality of living activities. The inference process includes a selection process and a determination process. The activity inferrer 10 is configured to, in the selection process, select from the plurality of rules a rule to be used in the determination process, depending on the past living activity. The activity inferrer 10 is configured to, in the determination process, determine which one of the plurality of living activities the current living activity corresponds to, based on the rule selected through the selection process and the existing information. Note that, the second feature is optional.

Further, the living activity inference device 1 of the present embodiment includes the following third feature in addition to the second feature. In the third feature, the activity inferrer 10 is configured to store an occurrence order indicative of an order of occurrence of the plurality of living activities. The activity inferrer 10 is configured to, in the selection process, select the rule corresponding to a living activity next to the past living activity in the occurrence order, as the rule to be used in the determination process. Note that, the third feature is optional.

Further, the living activity inference device 1 of the present embodiment includes the following fourth feature in addition to the second or third feature. In the fourth feature, each rule defines a condition regarding the operational state of the electric appliance 3 associated with the living activity corresponding to the rule. Note that, the fourth feature is optional.

Accordingly, the living activity inference device 1 of the present embodiment employs a configuration of inferring a living activity from a monitored operational state of the electric appliance 3 and yet use the past activity class which is the result of the inference of the living activity in the condition, and thereby can have an improved inference accuracy.

Further, in the living activity inference device 1 of the present embodiment, the appliance operation detector 16 detects whether the operational state of the electric appliance 3 is a start of working or an end of working.

Further, the living activity inference device 1 of the present embodiment includes the following fifth feature in addition to any one of the second to fourth features. In the fifth feature, the operational state includes a start of working indicating that the electric appliance 3 has changed from a resting state to a working state, and an end of working indicating that the electric appliance 3 has changed from the working state to the resting state. Note that, the fifth feature is optional.

Further, the living activity inference device 1 of the present embodiment includes the following sixth feature in addition to the fifth feature. In the sixth feature, the appliance operation detector 16 is configured to determine that the operational state is the start of working when the energy consumption obtained by the obtainer 12 exceeds a predetermined threshold. The appliance operation detector 16 is configured to determine that the operational state is the end of working when the energy consumption obtained by the obtainer 12 is equal to or less than the predetermined threshold. Note that, the sixth feature is optional.

Further, in the living activity inference device 1 of the present embodiment, the obtainer 12 obtains an amount of energy consumed by the electric appliance 3 from the power sensor 23 provided one-by-one to the branch line Lb for supplying energy to the electric appliance 3 from the home distribution circuit board.

Further, the living activity inference device 1 of the present embodiment includes the following seventh feature in addition to any one of the second to sixth features. In the seventh feature, the obtainer 12 is connected to a power sensor 23 for measuring an amount of energy transferred through an energy supply line (branch line) Lb for supplying energy to the electric appliance 3, and is configured to obtain the amount of energy measured by the power sensor 23 as the energy consumption of the electric appliance 3. Note that, the seventh feature is optional.

Further, in the living activity inference device 1 of the present embodiment, at least one of the branch lines Lb is connected to the electric appliance 3 exclusively. The activity inferrer 10 infers the activity class corresponding to the major use by use of at least one rule which has the condition including the major use of the room in which the electric appliance 3 exclusively connected to the branch line Lb.

Further, in the living activity inference device 1 of the present embodiment, the activity inferrer 10 infers the activity class by use of at least one rule which has the condition including an event in which an amount of energy corresponding to use of the electric appliance 3 is consumed at the branch line which is of the branch lines Lb and does not provide the standby energy.

Further, in the living activity inference device 1 of the present embodiment, At least one rule has the condition including the time period in which the activity class occurs. In the inference of the activity class, the activity inferrer 10 applies the time period to the condition of the rule.

In other words, the living activity inference device 1 of the present embodiment includes the following eighth feature in addition to any one of the second to seventh features. In the eighth feature, the existing information includes at least one of: an intended purpose of a location associated with the electric appliance 3; information that the energy consumption obtained from the power sensor 23 corresponding to the energy supply line (branch line) Lb which is not normally connected to the electric appliance 3 exceeds a predetermined threshold; and current time. Note that, the eighth feature is optional.

Further, in the living activity inference device 1 of the present embodiment, with regard to at least one rule including the logical disjunction of a plurality of preconditions, the activity inferrer 10 sets priorities regarding the order of determination of the precondition.

In other words, the living activity inference device 1 of the present embodiment includes the following ninth feature in addition to any one of the second to eighth features. In the ninth feature, at least one of the plurality of rules is a logical disjunction rule. The logical disjunction rule is a rule which determines that the current living activity is a living activity corresponding to the logical disjunction when any one of a plurality of conditions (preconditions) regarding the existing information is fulfilled. The activity inferrer 10 is configured to allocate priorities to the plurality of conditions individually. The activity inferrer 10 is configured to determine whether the existing information fulfills one selected from the plurality of conditions in order of the priorities from highest to lowest. Note that, the ninth feature is optional.

Further, in the living activity inference device 1 of the present embodiment, the activity inferrer 10 allocates a higher priority to the electric appliance 3 which shows a larger change in an amount of energy caused by a change of the operational state.

In other words, the living activity inference device 1 of the present embodiment includes the following tenth feature in addition to the ninth feature. In the tenth feature, the activity inferrer 10 is configured to adjust the priorities of the plurality of conditions such that a condition regarding the electric appliance 3 having a greater difference in the energy consumption between the working state and the resting state has a higher priority. Note that, the tenth feature is optional.

Note that, in the living activity inference device 1 of the present embodiment, it is preferable that the activity inferrer 10 change the priorities depending on the season. In other words, the living activity inference device 1 of the present embodiment may include the following eleventh feature in addition to the ninth feature. In the eleventh feature, the activity inferrer 10 is configured to change the priorities depending on a present season.

Further, in the living activity inference device 1 of the present embodiment, it is preferable that the condition of the rule used by the activity inferrer 10 include an operational state of a water-use appliance or a gas appliance calculated from a change of at least one of a water consumption and a gas consumption. In other words, the living activity inference device 1 of the present embodiment may include the following twelfth feature in addition to any one of the first to eleventh features. In the twelfth feature, the existing information includes at least one of: an operational state of a water-use appliance determined based on a water consumption; and an operational state of a gas appliance determined based on a gas consumption.

The living activity inference device 1 of the present embodiment described above is implemented by a compute which executes the following program. This program enables the computer to function as the living activity inference device 1 including the appliance register 15, the obtainer 12, the appliance operation detector 16, the activity inferrer 10, and the result storage 17. A plurality of electric appliances 3 of interest selected from the electric appliances 3 used in the residence are registered on the appliance register 15. The obtainer 12 obtains amounts of energy consumed by the electric appliances 3 registered on the appliance register 15. The appliance operation detector 16 detects the operational states of the individual electric appliances 3 by use of changes of the amounts of energy obtained by the obtainer 12. The activity inferrer 10 stores the group of rules each of which provides a conclusion indicative of an activity class defined by classification of the living activity, in response to a given condition including at least the operational state of the electric appliance 3, and infers the activity class by applying the operational states of the electric appliances 3 detected by the appliance operation detector 16 to the condition of the rule selected from the group of rule. The result storage 17 stores the activity class inferred by the activity inferrer 10 together with the date and time. The group of rules includes at least one rule having a condition including the activity class. In a process of inferring the activity class, the activity inferrer 10 applies the result of the inference indicative of the past activity class read out from the result storage 17 to the condition of the rule together with the operational state of the electric appliance 3.

In other words, the above program is a program enabling a computer to function as an obtainer 12, an appliance operation detector 16, and an activity inferrer 10. The obtainer 12 is configured to obtain an energy consumption of an electric appliance 3. The appliance operation detector 16 is configured to identify an operational state of the electric appliance 3 based on the energy consumption obtained by the obtainer 12. The activity inferrer 10 is configured to perform an inference process of determining which one of a plurality of living activities predetermined a current living activity corresponds to, based on existing information including the operational state of the electric appliance 3 identified by the appliance operation detector 16 and a past living activity.

Note that, such a program may be recorded on a computer-readable recording medium. In other words, this computer-readable recording medium is a computer-readable recording medium storing a program enabling a computer to function as an obtainer 12, an appliance operation detector 16, and an activity inferrer 10. The obtainer 12 is configured to obtain an energy consumption of an electric appliance 3. The appliance operation detector 16 is configured to identify an operational state of the electric appliance 3 based on the energy consumption obtained by the obtainer 12. The activity inferrer 10 is configured to perform an inference process of determining which one of a plurality of living activities predetermined a current living activity corresponds to, based on existing information including the operational state of the electric appliance 3 identified by the appliance operation detector 16 and a past living activity.

The invention claimed is:

1. A living activity inference device, comprising:
   an obtainer configured to obtain an energy consumption of an electric appliance;
   an appliance operation detector configured to identify an operational state of the electric appliance based on the energy consumption obtained by the obtainer; and
   an activity inferrer configured to perform an inference process of determining which one of a plurality of living activities predetermined a current living activity corresponds to, based on existing information including the operational state of the electric appliance identified by the appliance operation detector and a past living activity,
   the activity inferrer being configured to store a plurality of rules individually corresponding to the plurality of living activities,
   the inference process including a selection process and a determination process,
   the activity inferrer being configured to, in the selection process, select from the plurality of rules a rule to be used in the determination process, depending on the past living activity, and
   the activity inferrer being configured to, in the determination process, determine which one of the plurality of living activities the current living activity corresponds to, based on the rule selected through the selection process and the existing information.

2. The living activity inference device according to claim 1, wherein:
   the activity inferrer is configured to store an occurrence order indicative of an order of occurrence of the plurality of living activities; and
   the activity inferrer is configured to, in the selection process, select the rule corresponding to a living activity next to the past living activity in the occurrence order, as the rule to be used in the determination process.

3. The living activity inference device according to claim 1, wherein each rule defines a condition regarding the operational state of the electric appliance associated with the living activity corresponding to the rule.

4. The living activity inference device according to claim 1, wherein the operational state includes a start of working indicating that the electric appliance has changed from a resting state to a working state, and an end of working indicating that the electric appliance has changed from the working state to the resting state.

5. The living activity inference device according to claim 4, wherein:

the appliance operation detector is configured to determine that the operational state is the start of working when the energy consumption obtained by the obtainer exceeds a predetermined threshold; and the appliance operation detector is configured to determine that the operational state is the end of working when the energy consumption obtained by the obtainer is equal to or less than the predetermined threshold.

6. The living activity inference device according to claim 1, wherein the obtainer is connected to a power sensor for measuring an amount of energy transferred through an energy supply line for supplying energy to the electric appliance, and is configured to obtain the amount of energy measured by the power sensor as the energy consumption of the electric appliance.

7. The living activity inference device according to claim 6, wherein the existing information includes at least one of:

an intended purpose of a location associated with the electric appliance;

information that the energy consumption obtained from the power sensor corresponding to the energy supply line which is not normally connected to the electric appliance exceeds a predetermined threshold; and current time.

8. The living activity inference device according to claim 1, wherein:

at least one of the plurality of rules is a logical disjunction rule;

the logical disjunction rule is a rule which determines that the current living activity is a living activity corresponding to the logical disjunction rule when any one of a plurality of conditions regarding the existing information is fulfilled;

the activity inferrer is configured to allocate priorities to the plurality of conditions individually; and the activity inferrer is configured to determine whether the existing information fulfills one selected from the plurality of conditions in order of the priorities from highest to lowest.

9. The living activity inference device according to claim 8, wherein the activity inferrer is configured to adjust the priorities of the plurality of conditions such that a condition regarding the electric appliance having a greater difference in the energy consumption between the working state and the resting state has a higher priority.

10. The living activity inference device according to claim 8, wherein the activity inferrer is configured to change the priorities depending on a present season.

11. The living activity inference device according to claim 1, wherein the existing information includes at least one of:

an operational state of a water-use appliance determined based on a water consumption; and an operational state of a gas appliance determined based on a gas consumption.

12. A program enabling a computer to function as an obtainer, an appliance operation detector, and an activity inferrer, the obtainer being configured to obtain an energy consumption of an electric appliance, the appliance operation detector being configured to identify an operational state of the electric appliance based on the energy consumption obtained by the obtainer, the activity inferrer being configured to perform an inference process of determining which one of a plurality of living activities predetermined a current living activity corresponds to, based on existing information including the operational state of the electric appliance identified by the appliance operation detector and a past living activity, the activity inferrer being configured to store a plurality of rules individually corresponding to the plurality of living activities, the inference process including a selection process and a determination process, the activity inferrer being configured to, in the selection process, select from the plurality of rules a rule to be used in the determination process, depending on the past living activity, and the activity inferrer being configured to, in the determination process, determine which one of the plurality of living activities the current living activity corresponds to, based on the rule selected through the selection process and the existing information.

13. A non-transitory computer-readable recording medium storing a program enabling a computer to function as an obtainer, an appliance operation detector, and an activity inferrer, the obtainer being configured to obtain an energy consumption of an electric appliance, the appliance operation detector being configured to identify an operational state of the electric appliance based on the energy consumption obtained by the obtainer, the activity inferrer being configured to perform an inference process of determining which one of a plurality of living activities predetermined a current living activity corresponds to, based on existing information including the operational state of the electric appliance identified by the appliance operation detector and a past living activity, the activity inferrer being configured to store a plurality of rules individually corresponding to the plurality of living activities, the inference process including a selection process and a determination process, the activity inferrer being configured to, in the selection process, select from the plurality of rules a rule to be used in the determination process, depending on the past living activity, and the activity inferrer being configured to, in the determination process, determine which one of the plurality of living activities the current living activity corresponds to, based on the rule selected through the selection process and the existing information.

* * * * *